United States Patent [19]

Ljung

[11] 4,167,336
[45] Sep. 11, 1979

[54] RING LASER GYROSCOPE HAVING WEDGE DESENSITIZING OPTICAL MEANS

[75] Inventor: Bo H. G. Ljung, Wayne, N.J.

[73] Assignee: The Singer Company, Little Falls, N.J.

[21] Appl. No.: 782,460

[22] Filed: Mar. 29, 1977

[51] Int. Cl.² ............................ G01B 9/02; G01P 9/00
[52] U.S. Cl. .................................................... 356/350
[58] Field of Search ................................. 356/106 LR

[56] References Cited
U.S. PATENT DOCUMENTS 3,373,650  3/1968  Killpatrick .................... 356/106 LR

*Primary Examiner*—Vincent P. McGraw
*Attorney, Agent, or Firm*—Laurence A. Wright; Thomas W. Kennedy

[57] ABSTRACT

A ring laser gyroscope having a triangular block configuration and means to dither the block about its line of symmetry. The triangular block is configured to be symmetrical about its axis of symmetry to reduce the temperature gradient across the instrument, which effect causes output signals in the absence of an input angular rate. An optical wedge attached to the output reflector of the triangular block and an external output prism form an interferometer by means of which the sensitivity of the device is reduced and the interferometer signal made equal and opposite to that of the laser cavity.

11 Claims, 5 Drawing Figures

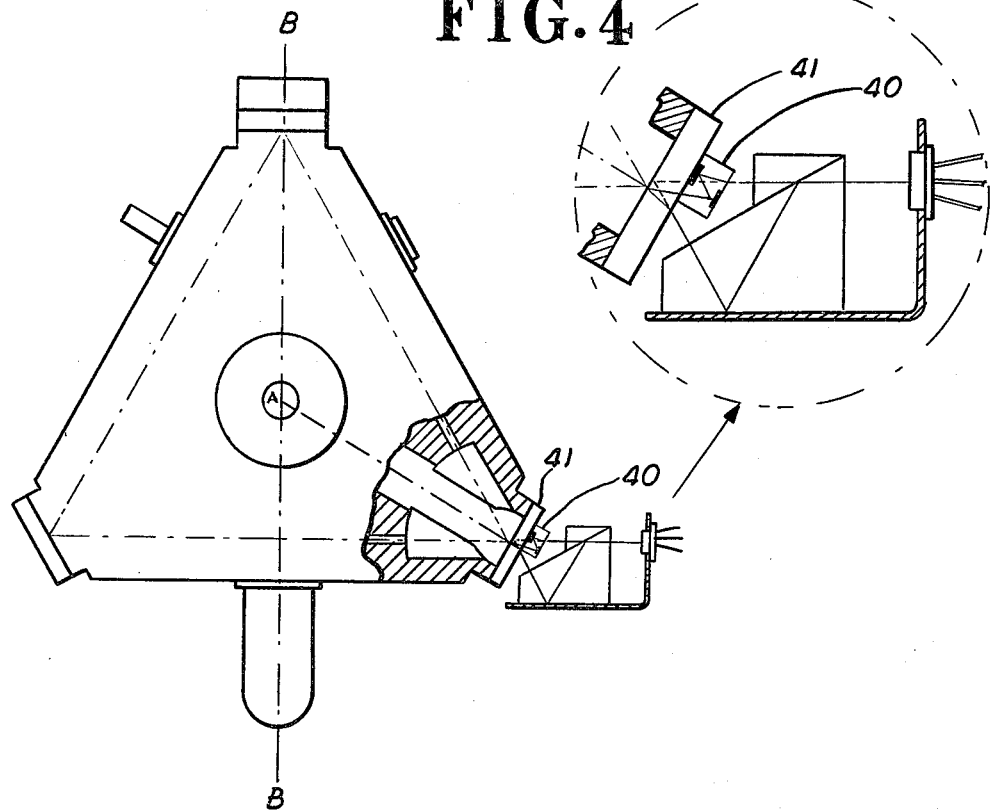
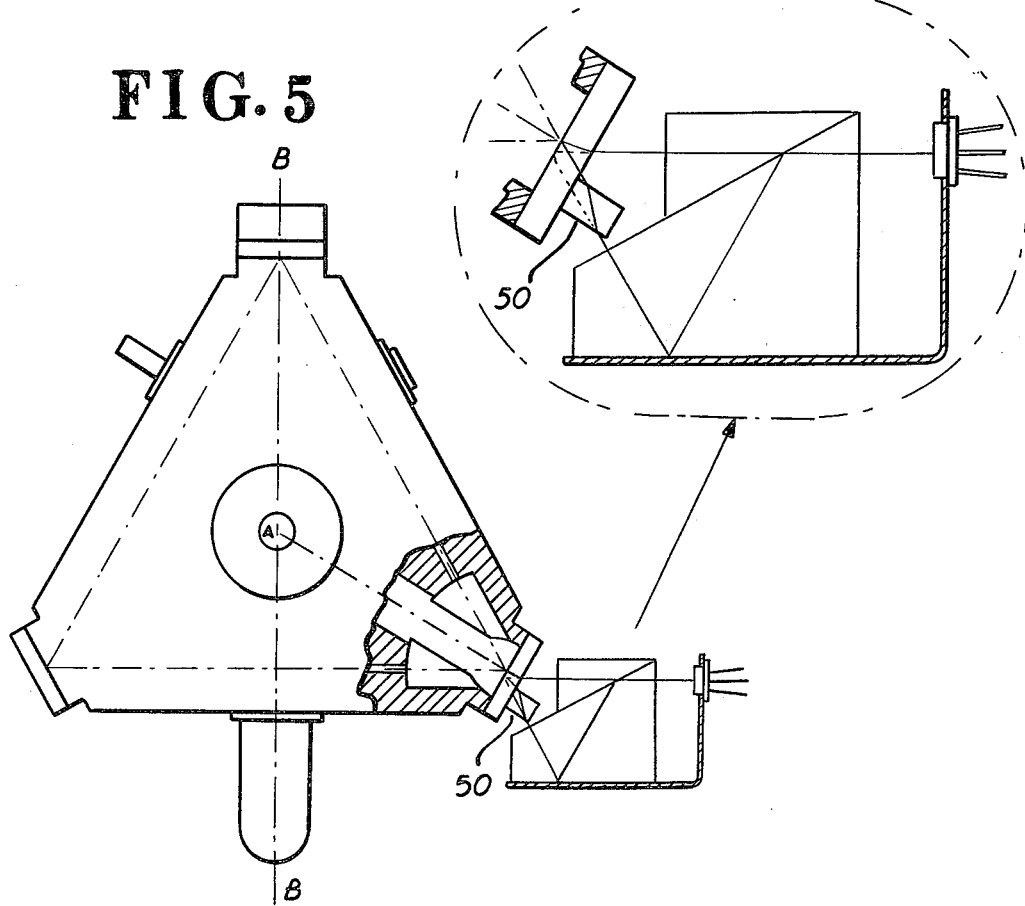

RING LASER GYROSCOPE HAVING WEDGE DESENSITIZING OPTICAL MEANS

This invention relates to angular rate sensor devices. More particularly, this invention relates to a ring laser gyro configured to be symmetrical about its line of symmetry to compensate for temperature gradients on said device and having means to reduce the sensitivity of the instrument so that there is only an output due to input angular rate.

BACKGROUND OF THE INVENTION

The ring laser gyro is a significant departure from prior art angular rate sensor devices. Conventional angular rate sensors employ a spinning mass to provide a reference direction. These sensors comprising spinning masses have inherent problems among which are high drift rates, caused by friction, and unwanted torques. The ring laser gyro for the most part eliminates the undesirable characteristics of the prior art sensors. Its operation is based entirely upon optical and electronic phenomena wherein angular motion is measured by the massless light waves circulating in a closed path.

The prior art (e.g., U.S. Pat. Nos. 3,373,650 and 3,467,472 to Joseph E. Kilpatrick) teaches a triangularly shaped ring laser resonant cavity defined by three corner mirrors. The triangular shape is preferred because it uses a minimum number of mirrors. A gas laser fills the laser cavity. The gas laser filling the cavity comprises Helium and Neon gas operating at one of three wavelengths, either 3.39 or 1.15 micrometers in the infrared spectral band or 0.6328 micrometers in the visible wavelength region. Through a proper choice of the ratio of the two neon isotopes $Ne^{20}$ and $Ne^{22}$ in the gas mixture, two monochromatic beams are created. The two laser beams propagate in clockwise and counterclockwise directions around the triangular cavity following the same closed path. With no rotation about the input axis, the cavity lengths for the two beams are equal and the two optical frequencies are the same. Rotation in either direction causes an apparent increase in cavity length for the beam travelling in the direction of rotation and a decrease for the other beam. Since the closed optical path is a resonant cavity providing sustained oscillation, the wavelength of each beam must also increase or decrease accordingly. Rotation of the ring in either direction thus causes a frequency split and the two frequencies are unequal by an amount proportional to the rotation rate. At the output mirror, the clockwise and counterclockwise beams are extracted and combined by an output prism to produce an interference pattern which is detected by a photodetector. The photodetector senses the beat frequency caused by heterodyning of the two signal frequencies. The beat frequency output is the measure of rotation rate.

All ring laser gyroscopes are sensitive to temperature gradients across their line of symmetry. Such gradients affect the Langmuir flow. The Langmuir flow, caused by cataphoretic pumping between anode-cathode, is usually well-balanced by careful machining of the capillary hole that contains the glow discharge and by the utilization of two symmetrically placed glow discharges as well as by maintaining a constant current discharge in the two glow discharges by means of two active current regulators.

The ring laser gyroscopes of the prior art are extremely sensitive to temperature changes present in the environment or temperature changes caused by warmup. These temperature changes in prior art ring laser gyroscopes cause gradients across their plane of symmetry because the gyroscope block, as taught by the prior art, was unsymmetrical. As a result, output pulses appear although there has been no rotation about the input axis. Making the block unsymmetrical was a method necessitated by the prior art to prevent lock-in by mechanical dither. Lock-in occurs at low input rotation rates, as the input rate falls below a certain critical or threshold value. In the lock-in region, a nonlinear relationship exists between the input and the output. Beyond the lock-in region, there is a substantial linear relationship between the input and output.

BRIEF DESCRIPTION OF THE INVENTION

The present invention teaches a triangularly shaped ring laser resonant cavity defined by three corner mirrors. A gas laser providing monochromatic light is an integral part of the cavity and it comprises a capillary glow discharge in Helium and Neon gas mixture. The cavity is at its center supported on a post by a plurality of spring means all located at the line of symmetry of the cavity. In the invention, no asymmetrical cutouts or displaced holes are required as taught by the prior art. Thus, a change in temperature in the environment or a change in temperature due to start causes no temperature gradients across the line of symmetry of the device. An optical wedge made of glass or glass-ceramic is attached to the output reflector. The wedge causes the beams to be somewhat angularly displaced. This reduces the sensitivity of the interferometer formed between the wedge and the retro-reflector. Properly chosen wedge angle causes the sensitivity of this interferometer to be equal and opposite that of the ring laser when the laser is dithered about its central symmetry point.

Accordingly, it is an object of this invention to provide a ring laser gyro inherently insensitive to temperature changes.

It is another object of the invention to provide a ring laser gyro having means to reduce the sensitivity of the instrument so that an output appears only as the results of an input angular rate.

These and other objects, features and advantages of the present invention will become apparent from the following description taken in conjunction with the accompanying drawings wherein.

FIG. 4 shows a schematic representation of another embodiment of the invention wherein the beams are translated by reflection to facilitate equal and opposite sensitivity; and FIG. 5 shows a further embodiment of the invention similar to FIG. 4 using the refracting properties of a parallelepiped of glass or glass-ceramic whereby the beams are translated to facilitate equal and opposite sensitivity of ring laser and interferometer.

Figure 1:
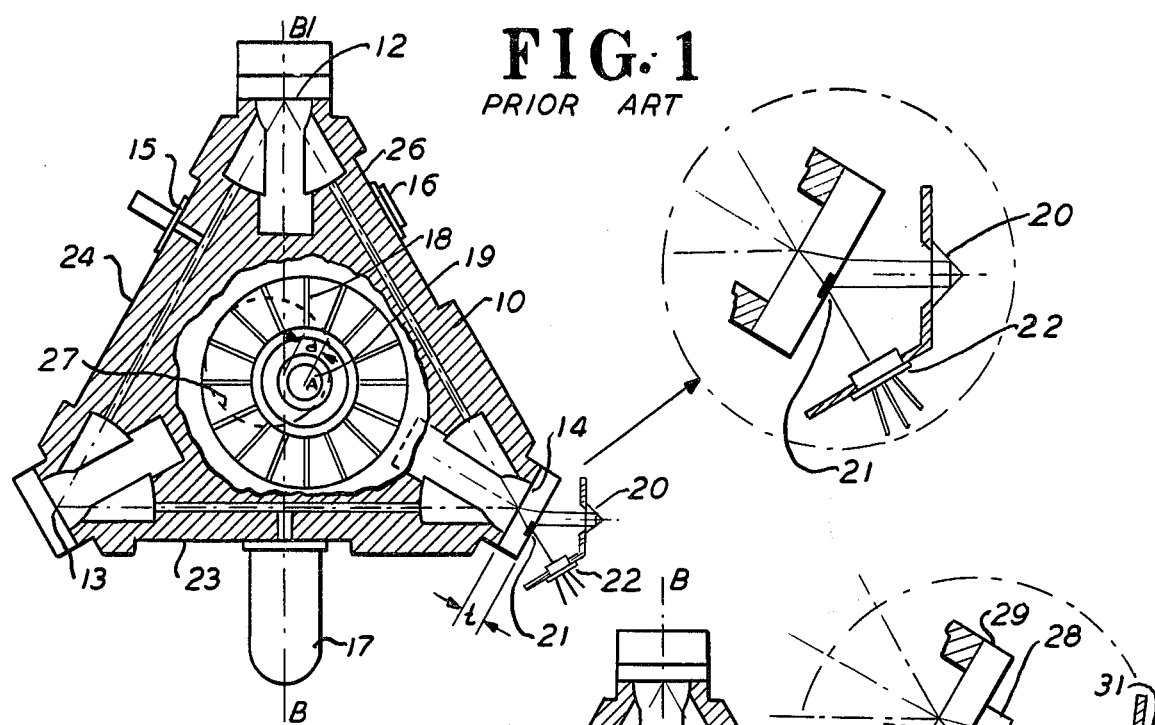
FIG. 1 is a schematic representation of a prior art ring laser gyro which is sensitive to temperature gradients across its line of symmetry.

Referring to FIG. 1, there is disclosed a prior art ring laser gyro with a conventional beam combiner which will be explained hereinafter to show the means conventionally employed to obviate lock-in. The gyro consists of a glass-ceramic triangular block 10 into which the cavity is machined. The cavity is defined by two high reflectors 12 and 13 and an output reflector 14. A plasma discharge between two anodes 15 and 16 and the cathode 17 is used to provide the necessary gain in the He Ne filled cavity.

Block 10 is mechanically supported to its case by a spring 18. This spring is attached to the case at the support post 19. The block is driven, by means of external piezoelectric actuators (not shown) for example, such as to dither around point A. The purpose of this dither is to introduce an input rate high enough to eliminate the lock-in effect. This is most effectively accomplished by use of a psuedo random dither. In order to precisely recover the actual input rate that the ring laser is subjected to, it is necessary to use a compensating beam combiner. This beam combiner consists of retro-reflector 20, here shown as a Porro prism. A Porro prism is a triangular optical device having one 90° and two 45° angles. Light enters almost perpendicular to the hypotenuse, and, after two internal reflections, leaves by the same face. Cube reflectors are also used. The CW and CCW monochromatic light beams are combined at the half-silvered mirror 21. Heterodyning or the mixing of the two CW and CCW beams is detected by means of photodetector 22. The retro-reflector and in most cases the photodetector are fixed to the case. By this implementation of the CW and CCW beams, an interferometer is formed. Simply stated, an interferometer is any arrangement whereby a beam of light is separated into two or more parts by partial reflections, the parts being subsequently reunited after traversing different optical paths. The sensitivity of the interferometer formed is equal and opposite that of the ring laser gyro output when the gyroscope is dithered around point A which is selected so that the offset, d, equals the thickness, t, of mirror 14.

The prior art teaches combining the CW and CCW beams so that a small angle of convergence is formed between the two beams as they reach the photodetector 22. By so doing, an interference pattern is formed that consists of two or more bright areas interspaced by dark areas. This bar-shaped pattern moves to either side depending on the direction the ring laser is rotated. The sense of rotation of the ring laser can thus be sensed by dividing the photodetector 22 into two areas, spaced a fraction (90°) of the bar-shaped pattern.

Prior art technique utilizes a retro-reflector 20 that retro-reflects the output beam angularly displaced by a small amount, typically a few minutes of arc, to form the above-mentioned convergence, to facilitate detection of the sense of rotation of the ring laser. A Porro prism is relatively easy to fabricate such as to have the desired angular displacement. However, a Porro prism has certain disadvantages when used as a retro-reflector because it has quite a difficult adjustment procedure. Most prior art ring laser gyroscopes, therefore, use a corner cube retro-reflector. It is difficult and expensive to fabricate a corner cube reflector with a certain angular offset because the offset is governed by the accurate fabrication of four optical surfaces set by six angles.

This invention makes it practical to use either a Porro prism or a corner cube retro-reflector with nominal angles without deliberate angular offset. Such retro-reflectors are much less difficult to fabricate and easier to align than those with a built-in precision angular offset. The required angular convergence may conveniently be achieved by angularly displacing the wedge 28 in FIG. 2. By offsetting this wedge one-half of the required convergence angle, the half-silvered area 30 on the wedge causes the CW beam to be angularly displaced to form the interference bar pattern on detector 22.

Asymmetrical cutouts 23, 24 and 26 together with a displaced hole 27 are used to mechanically balance the block around its support post 19. This balancing is necessary in order to avoid mechanical coupling to external sources of linear vibration.

The disadvantage of the ring laser gyro described in FIG. 1 is that it is extremely sensitive to temperature gradients across its symmetry axis B—B shown in FIG. 1. These gradients change the gas flow in the cavity resulting in output pulses at the times when no input rate is being introduced. This bias instability occurs in the prior art device of FIG. 1 when there is a change in the external temperature. The reason for this is that the unsymmetrical block induces temperature gradients. The time constants involved are in the order of hours.

Figure 2:
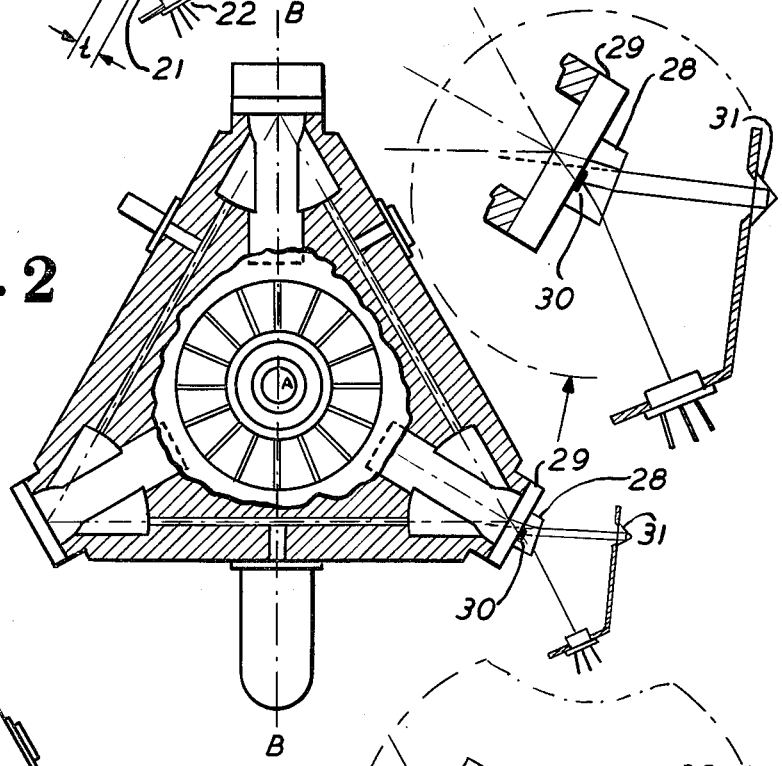
FIG. 2 is a schematic representation of the improved ring laser gyro of the invention showing the attached wedge.

Referring to FIG. 2, there is shown one embodiment of the present invention. The structure shown in FIG. 2 is basically the same as shown in FIG. 1. Therefore, only the salient features constituting the invention are discussed in detail. In FIG. 2, the center of the spring and its support post, point A, is located on the center line B—B of the block. Furthermore, neither asymmetrical cutouts nor displaced holes through the block are needed. An optical wedge 28, made for example of U.L.E., is attached to the output mirror 29 by means of an optical adhesive. U.L.E. is Corning Glassworks' trade name for ultra low expansion silica, a titania stabilized glass-ceramic. U.L.E. is water clear and affords a good thermal expansion match to the laser block. The laser block is commonly made in another helium diffusion resistant glass-ceramic with low thermal expansion: Cervit 101 from Owens-Illinois or Zerodur from Schott. A good thermal expansion match is necessary in order to avoid optical birefringence due to thermally induced stresses. Wedge 28 has one part half-silvered 30. All optical air surfaces are typically anti-reflective coated, for example V-coated, in order to reduce losses. The retro-reflector 31, shown here as a Porro prism, but may also be configured as a corner cube reflector, is also anti-reflective coated on its hypotenuse. It is also customary to angularly offset the retro-reflector somewhat in order to avoid that first surface reflection coupling back into the laser cavity.

Wedge 28 causes the CCW beam to be somewhat angularly displaced. This reduces the sensitivity of the interferometer formed between the wedge and retro-reflector 31. Properly chosen wedge angle causes the sensitivity of this interferometer to be equal and opposite that of the ring laser, when the latter is dithered around point A. It has been discovered that the correct wedge angle for geometry and materials employed is approximately 4°.

The embodiment of FIG. 2 allows the use of a symmetrical block with symmetrically arranged suspension. The advantages over the prior art are bias instability due to asymmetry is eliminated, there is no need for balance cutouts and displaced holes, and the output reflector can be placed on the block in an optimal position to minimize back-scatter. This is not possible in prior art (e.g., FIG. 1) instruments because the output reflector 14 has one spot half-silvered 21 in previous fabrication.

Figure 3:
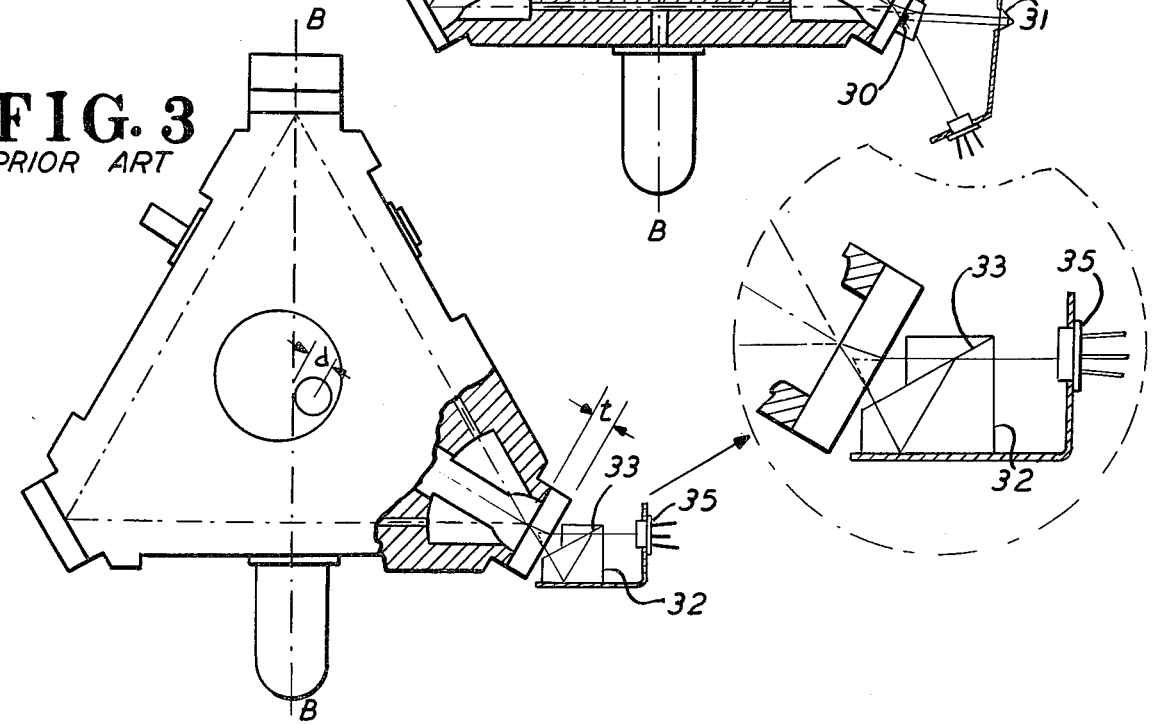
FIG. 3 is a view similar to FIG. 1 showing a prior art usage of a prism as a beam combiner.

FIG. 3 is another example of a prior art beam combiner utilizing a prism 32. It can be noted that the required offset, d, equals the mirror thickness, t. The prism has a half-silvered interface 33 by means of which the CW and CCW beams in the laser are heterodyned. The prism and usually the detector 35 are case fixed.

FIG. 4 is a second embodiment of the invention showing a novel way of translating the beams such as to facilitate zero offset, e.g., the dither suspension mounted on the symmetry line B—B. The beam translation is accomplished by a rectilinear parallelepiped 40 partly made reflective and attached to the output reflector 41. It can be noted that the beams' extension (dashed lines) cross the inner face of the output reflector.

FIG. 5 shows another embodiment of the invention wherein the beam translator uses the refracting properties of the parallelepiped 50. Practically, this configuration is less desirable than that of FIGS. 2 and 4 because it is difficult to fabricate anti-reflective coatings with good properties for s-polarized light at a high angle of incidence.

From the foregoing, a ring laser gyroscope having refractive means to allow a symmetrical design and support of a ring laser that eliminates the sensitivity for temperature changes has been disclosed. In addition, the invention allows the output reflector to be placed in an optimal position to minimize back-scatter and thus achieve better instrument performance. Moreover, the invention teaches use of reflective means to achieve the purposes stated above. Although only preferred embodiments of the present invention have been described herein, it is not intended that the invention be restricted thereto, but it be limited only by the true spirit and scope of the appended claims.

What is claimed is:

1. A ring laser gyroscope comprising:
   means configured to be symmetrical about its axis of symmetry for eliminating temperature gradients across said axis of symmetry and supporting two counter-rotating beams of monochromatic light along a closed loop about a rotation axis, a difference in frequency occurring between said beams due to rotation about said rotation axis,
   means attached to said supporting means for displacing one of said monochromatic beams at the exit of said supporting means, and
   means for redirecting said beam from said displacing means along a separate optical path so as to reduce the sensitivity of the interferometer formed between said displacing means and said beam redirecting means to render the sensitivity of the thus formed interferometer exactly equal and opposite the sensitivity of said laser gyroscope.

2. The ring laser gyroscope of claim 1 wherein said means for displacing and for redirecting said beam comprises:
   a partially half-silvered wedge having an angle of approximately 4° and made of a material having similar thermal expansion as said support means and said wedge being attached to the output mirror of said supporting means, and
   a retro-reflector for redirecting said beam from said wedge along a separate optical path.

3. The ring laser gyroscope of claim 1 wherein said means for displacing and redirecting said beam comprises:
   a parallelepiped having a short dimension and a long dimension with partially silvered areas attached along its long dimension to the output of said supporting means, and
   a beam combiner redirecting said beam from said parallelepiped to facilitate zero offset of said supporting means from its line of symmetry with respect to said laser gyroscope.

4. The ring laser gyroscope of claim 3 comprising:
   a parallelepiped with partially silvered areas attached to output mirror of said supporting means along the short dimension of said parallelepiped.

5. A ring laser gyroscope comprising:
   a triangularly shaped laser cavity being symmetrical about its axis of symmetry to reduce temperature gradients across said axis of symmetry and having lasing means as an integral part of said cavity for producing counter-rotating beams of monochromatic light, a reflecting surface at the junction of each leg of said cavity, one of said reflecting surfaces being an output reflector,
   a base,
   means for centrally supporting said laser cavity on said base for pseudo random dithering of said cavity,
   a detector,
   means adjacent said output reflective surfaces for intercepting said monochromatic light emitted from said cavity and for directing said light along a predetermined path to said detector, and
   optical means attached exteriorly of said output reflective surface for deflecting the path of the output light of said optical means and said means adjacent said output reflective means forming an interferometer with said optical means whereby the signal presented to said detector is equal to and opposite that of said ring laser.

6. The ring laser gyroscope of claim 5 wherein said optical means and said means adjacent said output reflector comprises:
   an optical wedge attached to said output reflector for deflecting the path of the output light, and
   a right angle prism having equal right angle leg lengths said prism intercepting light essentially perpendicular to its hypotenuse emitted from said optical wedge.

7. The ring laser gyroscope of claim 5 wherein said optical means and said means adjacent said output reflector comprises:
   an optical wedge attached to said output reflector by means of an optical adhesive adjusted to angularly displace the optical wedge, and
   a corner cube retro-reflector,
   said optical wedge causing an interference pattern for sense detection utilizing said corner cube retro-reflector without deliberate offset between reflecting surfaces within said retro-reflector.

8. The ring laser gyroscope of claim 5 wherein said optical means and said means adjacent said output reflector comprises:
   a corner cube retro-reflector,
   an output reflector consisting of a flat and essentially parallel body having a small angular displacement between said flat surfaces, and
   an optical wedge attached to said output reflector by means of an optical adhesive adjusted to a uniform thickness to render said output reflector parallel to said wedge said arrangement causing an interference pattern for sense detection utilizing said corner cube retro-reflector without deliberate offset between reflecting surfaces within said retroreflector.

9. The ring laser gyroscope of claim 5 wherein said optical means and said means adjacent said output reflector comprises:
an optical parallelepiped with silvered areas attached to said reflector for deflecting the path of the output light, and
a prism for intercepting light from said optical wedge and altering the optical path of said light for detection.

10. The ring laser gyroscope of claim 5 wherein said optical means and said means adjacent said output reflector comprises:
an optical parallelepiped attached to said reflector along its shorter face for deflecting the path of the output light by refractions, and
a prism for intercepting light from said optical wedge and directing said light onto a detection means.

11. The ring laser gyroscope of claim 5 wherein said optical means comprises:
optical deflection means formed from ultra low expansion material.

* * * * *